United States Patent [19]

Husson et al.

[11] Patent Number: 4,547,732
[45] Date of Patent: Oct. 15, 1985

[54] DIGITAL TACHOMETER

[75] Inventors: Alan L. Husson, Hackettstown; Pantelis G. Tinios, Mt. Arlington, both of N.J.

[73] Assignee: Westinghouse Electric Corp., Pittsburgh, Pa.

[21] Appl. No.: 479,047

[22] Filed: Mar. 25, 1983

[51] Int. Cl.[4] .................. G01D 3/56; G06M 3/06
[52] U.S. Cl. ................... 324/166; 377/24; 364/200
[58] Field of Search ............ 377/24, 13, 110, 49; 364/200; 324/166

[56] References Cited

U.S. PATENT DOCUMENTS

| 4,042,068 | 8/1977 | Ostrander . | |
|---|---|---|---|
| 4,085,823 | 4/1978 | Caputo . | |
| 4,101,071 | 7/1978 | Brejnik | 377/49 |
| 4,355,279 | 10/1982 | Younge | 324/166 X |

FOREIGN PATENT DOCUMENTS 2856314  7/1980  Fed. Rep. of Germany ...... 324/166

Primary Examiner—Stanley T. Krawczewicz
Assistant Examiner—Jose M. Solis
Attorney, Agent, or Firm—D. R. Lackey

[57] ABSTRACT

A digital tachometer in which first pulses are produced at a rate proportional to the speed of a device. Second pulses are produced at a constant rate which exceeds the maximum rate of the first pulses, and a binary counter provides a binary count of the second pulses produced between two consecutive first pulses. A look-up table memory provides several blocks of addressable storage locations containing digital representations of speed. The MSB of the binary count selects a specific block of the memory, and the address of the selected block is derived from the binary count.

6 Claims, 7 Drawing Figures

DIGITAL TACHOMETER

BACKGROUND OF THE INVENTION

1. Field of the Invention

The invention relates in general to tachometers, and more specifically to tachometers for developing speed indications from pulses produced at a rate proportional to speed.

2. Description of the Prior Art

Certain applications, such as elevator systems, utilize one or more tachometers for providing monitoring and control systems for properly operating the elevator system. For example, U.S. Pat. No. 4,085,823, which is assigned to the same assignee as the present application, utilizes two tachogenerators to develop DC voltages representative of speed. One tachogenerator measures the rotational speed of the elevator drive motor, and the other tachogenerator measures the rotational speed of the governor sheave, which is driven by wire ropes attached to the elevator car. The outputs of the two tachogenerators, among other things, are used in a self-checking manner wherein they alternately develop speed points when the elevator system is operating correctly. The speed points and car position are also continuously compared to detect the need for an auxiliary terminal slowdown speed pattern, and also to detect the need for an emergency terminal stop. While one highly accurate, low noise, low ripple DC signal proportional to drive motor speed is required for speed and acceleration feedback signals in the motor control loop, the tachogenerator which monitors the governor sheave speed need not provide a smoothly changing signal. The latter is used in reference circuits which compare signal levels to develop speed checking points. Thus, it would be desirable to provide a less costly tachometer for measuring the rotational speed of the governor sheave, which is proportional to car speed, if the new tachometer can provide the resolution and accuracy required, especially towards the lower end of the speed range, and if the new tachometer can be economically constructed.

SUMMARY OF THE INVENTION

Briefly, the present invention is a new and improved digital tachometer which functions in response to first pulses generated in response to predetermined standard increments of travel of the device whose speed is to be measured. Second pulses are generated at a constant rate which greatly exceeds the maximum rate at which the first pulses will be generated. A binary counter counts the number of second pulses generated between two consecutive first pulses, and the binary count is changed to a digital count indicative of car speed via a look-up table in a read-only memory (ROM). Memory is conserved while providing excellent resolution at the lower end of the speed range by providing a plurality of blocks of memory in ROM, with the most significant bit (MSB) of the binary count selecting a predetermined memory block. The selected block of memory is addressed by an address derived from the binary count. For example, in one embodiment of the invention, the memory block is addressed by the highest six bits of the binary count, starting with the MSB. The digital representation of speed stored at the address location may be applied to a D-to-A converter, if an analog speed representation is desired.

BRIEF DESCRIPTION OF THE DRAWINGS

The invention may be better understood, and further advantages and uses thereof more readily apparent, when considered in view of the following detail description of exemplary embodiments, taken with the accompanying drawings in which.

DESCRIPTION OF THE PREFERRED EMBODIMENTS

The tachometer of the present invention may be used to monitor the speed of any device, rotational or rectilinear, for which a pulse may be generated for each predetermined standard increment of device travel. For purposes of example, it will be assumed that the device is an elevator car. In order to limit the length and complexity of the present application, the elevator systems shown in U.S. Pat. Nos. 4,085,823 and 4,042,068, both of which are assigned to the same assignee as the present application, are hereby incorporated into the present application by reference. U.S. Pat. No. 4,085,823 sets forth a dual tachometer monitoring system for an elevator system, with the tachometer of the present invention being substituted for one of the tachometers shown in this patent. U.S. Pat. No. 4,042,068 illustrates the development of a car motion or running signal 32L which may be used in implementing the teachings of the invention. Signal 32L goes true when the elevator car starts to move, and it remains true throughout the run.

Figure 1:
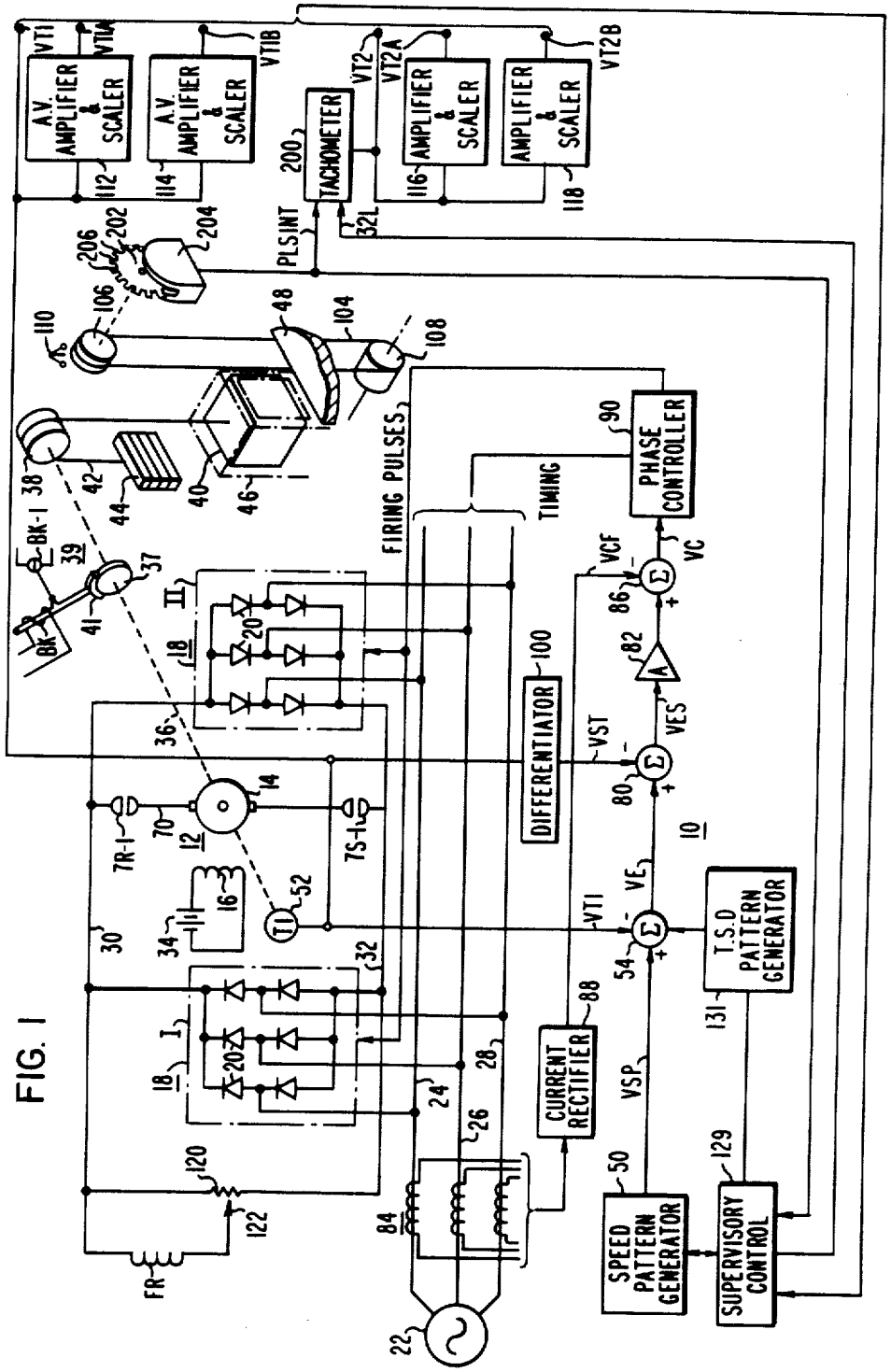
FIG. 1 is a schematic diagram of an elevator system which may utilize a digital tachometer constructed according to the teachings of the invention.

FIG. 1 is essentially the same as FIG. 1 of incorporated U.S. Pat. No. 4,085,823, setting forth an elevator system 10 which is modified to utilize a digital tachometer 200, which tachometer may be constructed according to the teachings of the invention. Since U.S. Pat. No. 4,085,823 may be referred to for a more detailed description of elevator system 10, only those parts of the elevator system 10 which are necessary for understanding the invention will be described in detail.

More specifically, elevator system 10 includes an elevator drive motor 12 having a drive shaft 36 to which a traction sheave 38 is secured. An elevator car 40 is supported by wire ropes 42 which are reeved over the traction sheave 38, with the other ends of the ropes being connected to a counterweight 44. The elevator car 40 is disposed in a hoistway 46 of a building having a plurality of floors or landings, such as the floor indicated generally at 48. A governor assembly is provided which includes a governor rope 104 connected to the elevator car 40. Rope 104 is reeved over a governor sheave 106 located at the top of the hoistway 46, and is also reeved around a pulley 108 located at the bottom of the hoistway. A governor 110 is driven by the shaft of the governor sheave 106. Thus, the rotational speed of sheave 106 is proportional to the speed of the elevator car 40.

Many elevator systems, such as the one shown in U.S. Pat. No. 3,750,850, which is also assigned to the same assignee as the present application, develop a count value representative of car position in the hoistway, with the count value being responsive to distance pulses generated in response to car travel. For example, a pulse may be generated in response to each 0.25 inch of car travel. An up/down counter in supervisory control 129 counts the distance pulses, incrementing the counter during up travel and decrementing the counter during down travel. Thus, the precise position of the elevator car in the hoistway is known at all times to the resolution of the standard increment 0.25 inch.

More specifically, a pulse wheel 202 may be suitably coupled for rotation in response to rotation of the governor sheave 106, and a pickup and pulse generator 204 is disposed to detect car movement via teeth 206 or other suitable circumferentially spaced openings. The teeth 206, or openings, are spaced to provide a distance pulse PLSINT for each standard increment of car travel, such as the hereinbefore-mentioned 0.25 inch. The detector portion of the pickup and pulse generator 204 may be of any suitable type, such as optical or magnetic.

Figure 6:
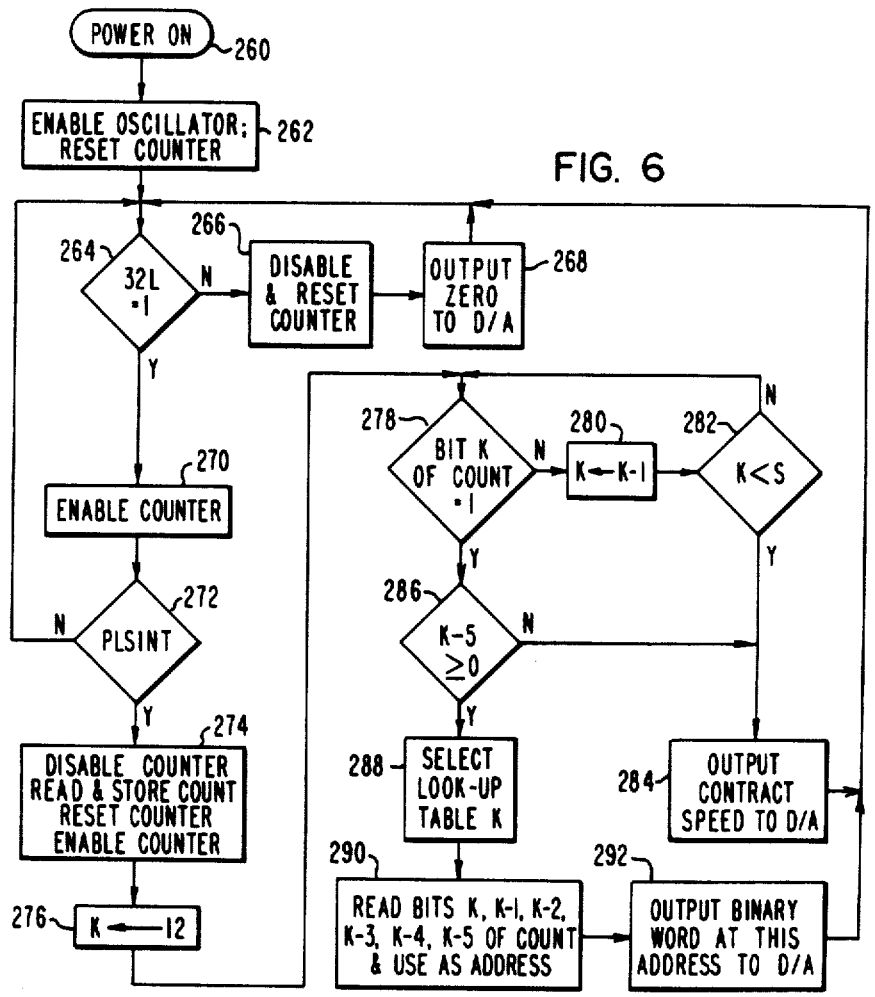
FIG. 6 is a flowchart of a program formulated in accordance with the teachings of the invention, which is also utilized by the tachometer shown in FIG. 2.

Tachometer 200 utilizes the distance pulses PLSINT, and it is also responsive to the running signal 32L from the supervisory control 129. FIG. 6 of incorporated U.S. Pat. No. 4,042,068 illustrates a detailed development of signal 32L.

Figure 2:
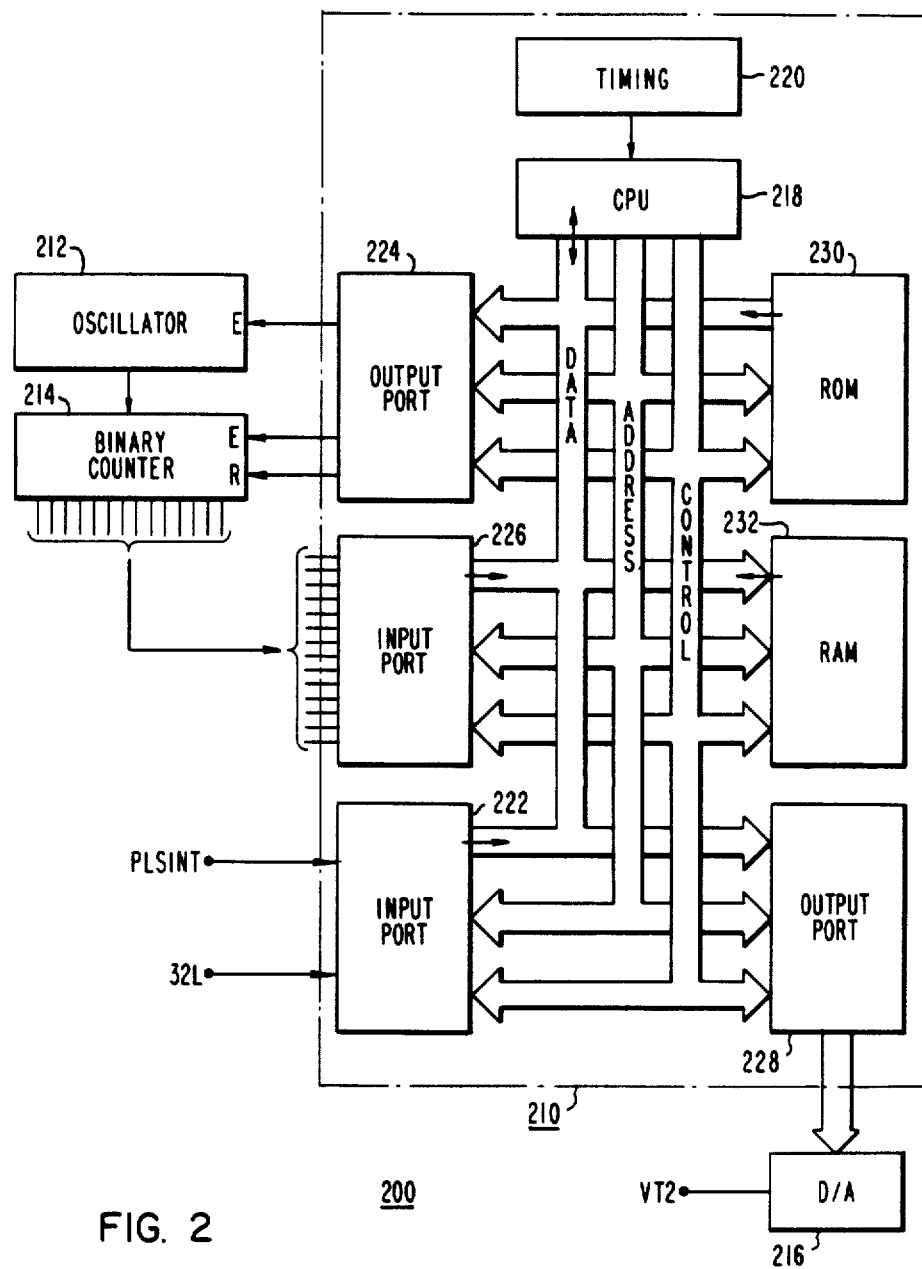
FIG. 2 is a block diagram of a digital tachometer constructed according to the teachings of the invention.

FIG. 2 is a block diagram of a tachometer 200 constructed according to the teachings of the invention, with the preferred embodiment utilizing a digital computer 210. Digital computer 210 may be a single board computer, such as Intel's iSBC 80/24 TM. However, because of the minuscule memory requirements of a tachometer constructed according to the teachings of the invention, digital computer 210 is well suited for a single chip microcomputer such as Intel's 8748.

In addition to digital computer 210, tachometer 200 includes an oscillator 212, such as RCA's CD4047B, a binary counter 214, such as Intel's 8115, and a digital-to-analog converter (D/A), such as Analog Devices 565. A/D converter 216 provides the analog speed signal VT2 used in the incorporated U.S. Pat. No. 4,085,823 to develop speed checkpoints for use in evaluating the performance of the elevator system 10.

Digital computer 210 includes a microprocessor or central processing unit (CPU) 218, which is connected to receive timing signals from a timing function or clock 220. CPU 218 receives the input pulses PLSINT and the input signal 32L via an input port 222, it controls the oscillator 212 and binary counter 214 via an output port 224, it receives the binary count of binary counter 214 via an input port 226, and it provides a digital representation of elevator car speed to the D/A converter 216 via an output port 228. Digital computer 210 also includes a read-only memory (ROM) 230, and a random-access memory (RAM) 232. ROM 230 stores certain constants, which are shown in the ROM map of FIG. 4, a look-up table, such as shown in the ROM map of FIG. 3, as well as the operating program set forth in FIG. 6.

Figure 5:
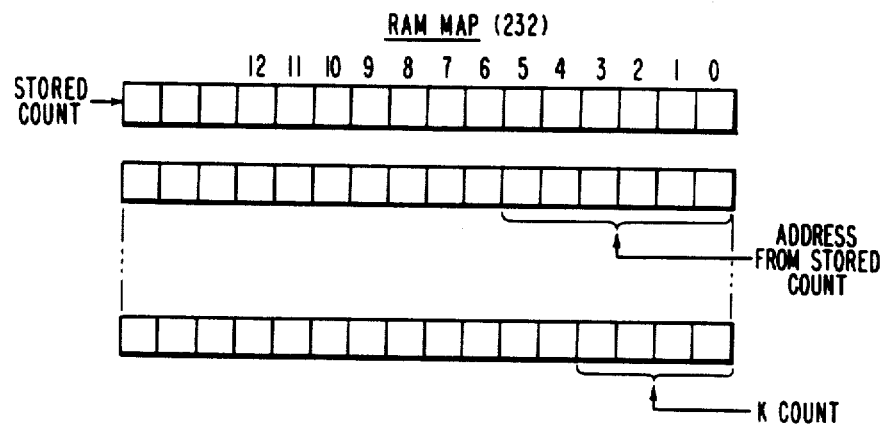
FIG. 5 is a RAM map of the RAM shown in FIG. 2, illustrating certain variables developed by the program shown in FIG. 6.

RAM 232 stores the latest binary count, as well as other variables, as set forth in the RAM map of FIG. 5.

The binary counter 214 is enabled when the elevator car 40 starts to move, signified by signal 32L going from a logic zero to a logic one, and the output of counter 214 is read and reset each time a distance pulse PLSINT is received. For purposes of example, the maximum speed of the elevator system will be assumed to be 1800 FPM, and the distance pulses PLSINT will be generated for each 0.25 inch of car travel. Thus, the maximum rate of pulses PLSINT will be:

$$\frac{1800 \text{ FPM}}{60 \text{ sec/min}} \times 12 \text{ inches/foot} \times 4 \text{ pulses/inch} = 1440 \text{ pulses/sec} \quad (1)$$

For good resolution and accuracy, the oscillator 212 must provide pulses at a constant rate which greatly exceeds the maximum rate of the PLSINT pulses. For purposes of example, it will be assumed that the pulse rate should be at least 100 times the maximum rate of the PLSINT pulses, or about 150 KHz.

The number of bits required in the binary counter 214 is determined by the lowest speed to be measured, which in an elevator system is about 30 FPM. Using this value for purposes of example, the minimum rate of the PLSINT pulses, for which tachometer 200 is to be concerned, is:

$$\frac{30 \text{ FPM}}{60 \text{ sec/min}} \times 12 \text{ inches/foot} \times 4 \text{ pulses/inch} = 24 \text{ pulses/sec} \quad (2)$$

The binary count (C) between two consecutive PSINT pulses generated at a predetermined rate (P) using an oscillator which generates 150,000 pulses per second may be determined as follows:

$$C = \frac{1}{P} \times 150,000; \text{ or } P = \frac{150,000}{C} \quad (3)$$

$$\frac{\text{Speed (FPM)}}{60} \times 12 \times 4 = P \quad (4)$$

substituting (3) into (4), provides:

$$\frac{\text{Speed (FPM)}}{60} \times 12 \times 4 = \frac{150,000}{C} \quad (5)$$

Thus:

$$\text{Speed (FPM)} = \frac{187,500}{C} \quad (6)$$

The decimal count C at the minimum speed of 30 FPM will be 60,250, which requires that the binary counter 214 have at least 13 bits numbered 0 through 12, with bit position 0 being the least significant bit (LSB), and with bit position 12 being the most significant bit (MSB).

Figure 3:
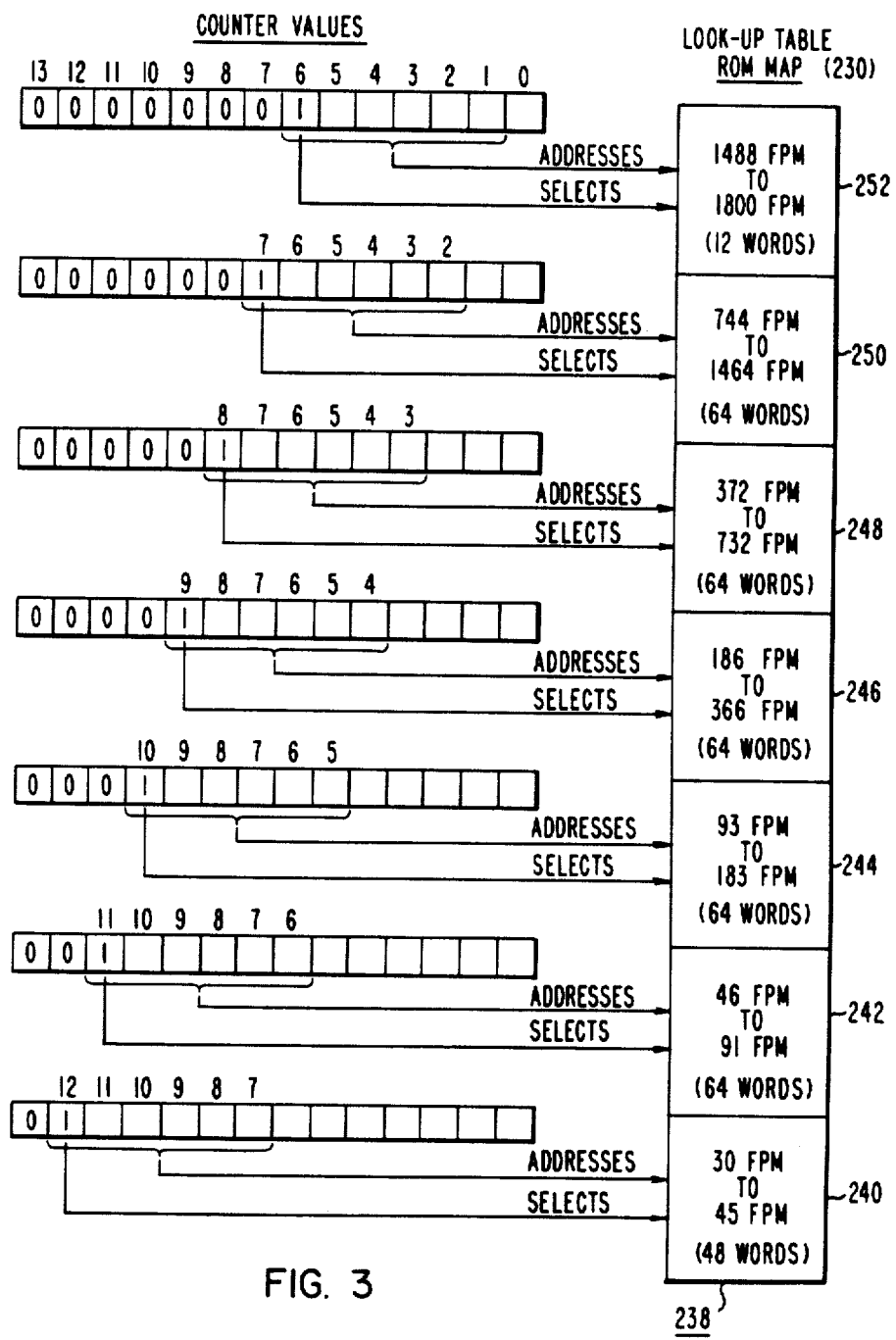
FIG. 3 is a diagrammatic representation of memory block selection and address development from the binary count, according to the teachings of the invention.
Figure 4:
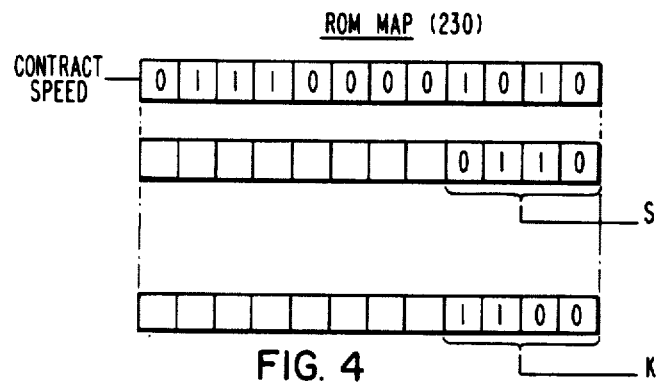
FIG. 4 is a ROM map of the ROM shown in FIG. 2, illustrating certain constants stored therein for use in a program shown in FIG. 6.

The memory-saving aspect of the invention may be understood with reference to FIG. 3. ROM 230 includes a look-up table 238, with FIG. 3 setting forth a ROM map of this table. The look-up table 238 has a plurality of addressable storage locations, with each location having a digital representation of car speed stored therein. Look-up table 238 is divided into a plurality of memory blocks, with the number of such blocks corresponding to the total number of different MSB's which will appear in the binary count of counter 214 over the speed range. Since the binary count over the speed range 30 FPM to 1800 FPM will be between decimal 6250 and decimal 104, the MSB will start at bit position 12 and end in bit position 6, of a 13-bit binary word which has bit positions referenced 0 through 12. This is seven different MSB's, and thus the look-up table in ROM 230 will have seven blocks of memory referenced 240, 242, 244, 246, 248, 250 and 252. When the MSB is in bit position 12, memory block 240 will be selected. In like manner, an MSB in bit position 11 will select memory block 242, an MSB in bit position 10 will select memory block 244, an MSB in bit position 9 will select memory block 246, an MSB in bit position 8 will select memory block 248, an MSB in bit position 7 will select memory block 250, and an MSB in bit position 6 will select a memory block 252.

The selection of a memory block is thus derived from the MSB. The next step in the memory-saving aspect of the invention derives the address of the selected memory block from the binary count. In a first embodiment of the invention, a fixed number of bits, starting with the MSB, is used at the address of the selected memory block. The fixed number chosen is determined by the resolution desired. In the example shown in FIG. 3, six bits, starting with the MSB, are chosen, with the six bits dramatically reducing memory requirements while providing more than adequate resolution across the entire speed range, including the lower end of the speed range which is important in the elevator application incorporated by reference. Notwithstanding the selection of a fixed number of address bits for all memory blocks, the resolution changes from memory block to memory block, being extremely good at the low end of the speed range, which is essential in the incorporated elevator application.

FIG. 3 sets forth the first embodiment of the invention, using the parameters set forth in developing equation (6). When the speed of the elevator car is between 30 FPM and 45 FPM, the MSB will be in bit position 12 of the binary count, and thus memory block 240 will be selected. The bits in positions 12, 11, 10, 9, 8 and 7 form the address for addressing this particular memory block. Six bits provide a total of 64 possible addresses, but only 48 addresses, and thus only 48 memory words in memory block 240, are required to cover the speed range of 30 FPM to 45 FPM. If all 64 memory memory words were to be utilized, memory block 240 would have the capability of covering the speed range from 23.2 to 45.8 FPM.

In like manner, the speed range of 46 FPM to 91 FPM results in the MSB being in bit position 11, which selects memory block 242. Memory block 242 contains 64 storage locations, which are addressable by the bits of the binary count located in bit positions 11, 10, 9, 8, 7 and 6.

The speed range of 93 FPM to 183 FPM results in the MSB being in bit position 10, which selects memory block 244. Memory block 244 includes 64 storage locations, which are addressable by the bits of the binary count located in bit positions 10, 9, 8, 7, 6 and 5.

The speed range of 186 FPM to 366 FPM results in the MSB being located in bit position 9, which selects memory block 246. Memory block 246 includes 64 storage locations, which are addressable by the bits of the binary count located in bit positions 9, 8, 7, 6, 5 and 4.

The speed range of 372 FPM to 732 FPM results in the MSB being located in bit position 8, which selects memory block 248. Memory block 248 includes 64 storage locations, which are addressable by the bits of the binary count located in bit positions 8, 7, 6, 5, 4 and 3.

The speed range of 744 FPM to 1464 FPM results in the MSB being located in bit position 7, which selects memory block 250. Memory block 250 includes 64 storage locations, which are addressable by the bits of the binary count located in bit positions 7, 6, 5, 4, 3 and 2.

The speed range of 1488 FPM to 1800 FPM results in the MSB being located in bit position 6, which selects memory block 252. Memory block 252 need only have 12 storage locations in order to cover this speed range, which locations are addressable by the bits of the binary count located in bit positions 6, 5, 4, 3, 2 and 1.

Table I set forth below tabulates the data contained in FIG. 3, and it illustrates that only 380 words of memory are required to cover the speed range of 30 FPM to 1800 FPM. Over 6,000 memory words would be required to address this same speed range when using the complete binary count to address the look-up table.

Tables II through VIII, also set forth below, are ROM maps of the look-up table 238, setting forth memory blocks 240 through 252, respectively. For example, when the elevator car 40 is traveling at a speed of 30 FPM, the binary count of counter 214 will be 1 1000 0000 0000 (decimal 6144). The address derived from this binary count is 110000. When memory block 240 of look-up table 238 in ROM 230 is addressed with this address, ROM 230 will output the value 11110 on the data bus. This value, when applied to the D/A converter 216 will provide a signal VT2 having an analog value representative of 30 FPM.

TABLE I

| SPEED | MSB (K) | NUMBER OF ADDRESS BITS | NUMBER OF MEMORY WORDS | NUMBER OF ADDRESS BITS | NUMBER OF MEMORY WORDS |
|---|---|---|---|---|---|
| 30 to 45 FPM | 12 | 6 | 48 | 4 | 12 |
| 46 to 91 FPM | 11 | 6 | 64 | 4 | 16 |
| 93 to 183 FPM | 10 | 6 | 64 | 5 | 32 |
| 186 to 366 FPM | 9 | 6 | 64 | 5 | 32 |
| 372 to 732 FPM | 8 | 6 | 64 | 6 | 64 |
| 744 to 1464 FPM | 7 | 6 | 64 | 6 | 64 |
| 1488 to 1800 FPM | 6 | 6 | 12 | 6 | 12 |
|  |  | TOTAL | 380 | TOTAL | 232 |

TABLE II

K = 12

| ANALOG COUNT | COUNTER VALUES | | | | | | | | | | | | | BLOCK 240 LOOK-UP TABLE 238 ROM MAP (230) | ANALOG SPEED (FPM) |
|---|---|---|---|---|---|---|---|---|---|---|---|---|---|---|---|
|  | 13 | 12 | 11 | 10 | 9 | 8 | 7 | 6 | 5 | 4 | 3 | 2 | 1 | 0 |  |  |
| 4096 | 0 | 1 | 0 | 0 | 0 | 0 | 0 | x | x | x | x | x | x | x | 1 0 1 1 0 1 | 45.8 |

TABLE II-continued

K = 12

| ANALOG COUNT | \multicolumn{14}{c}{COUNTER VALUES} | | | | | | | | | | | | | | BLOCK 240 LOOK-UP TABLE 238 ROM MAP (230) | | | | | | ANALOG SPEED (FPM) |
|---|---|---|---|---|---|---|---|---|---|---|---|---|---|---|---|---|---|---|---|---|---|
| | 13 | 12 | 11 | 10 | 9 | 8 | 7 | 6 | 5 | 4 | 3 | 2 | 1 | 0 | | | | | | | |
| 4224 | 0 | 1 | 0 | 0 | 0 | 0 | 1 | x | | | | | | x | 1 | 0 | 1 | 1 | 0 | 0 | 44.4 |
| 4352 | 0 | 1 | 0 | 0 | 0 | 1 | 0 | x | | | | | | x | 1 | 0 | 1 | 0 | 1 | 1 | 43.1 |
| 4480 | 0 | 1 | 0 | 0 | 0 | 1 | 1 | x | | | | | | x | 1 | 0 | 1 | 0 | 0 | 1 | 41.8 |
| 4608 | 0 | 1 | 0 | 0 | 1 | 0 | 0 | x | | | | | | x | 1 | 0 | 1 | 0 | 0 | 0 | 40.7 |
| 4736 | 0 | 1 | 0 | 0 | 1 | 0 | 1 | x | | | | | | x | 1 | 0 | 0 | 1 | 1 | 1 | 39.6 |
| 4864 | 0 | 1 | 0 | 0 | 1 | 1 | 0 | x | | | | | | x | 1 | 0 | 0 | 1 | 1 | 0 | 38.5 |
| 4992 | 0 | 1 | 0 | 0 | 1 | 1 | 1 | x | | | | | | x | 1 | 0 | 0 | 1 | 0 | 1 | 37.6 |
| 5120 | 0 | 1 | 0 | 1 | 0 | 0 | 0 | x | | | | | | x | 1 | 0 | 0 | 1 | 0 | 0 | 36.6 |
| 5248 | 0 | 1 | 0 | 1 | 0 | 0 | 1 | x | | | | | | x | 1 | 0 | 0 | 0 | 1 | 1 | 35.7 |
| 5376 | 0 | 1 | 0 | 1 | 0 | 1 | 0 | x | | | | | | x | 1 | 0 | 0 | 0 | 1 | 0 | 34.9 |
| 5504 | 0 | 1 | 0 | 1 | 0 | 1 | 1 | x | | | | | | x | 1 | 0 | 0 | 0 | 1 | 0 | 34.1 |
| 5632 | 0 | 1 | 0 | 1 | 1 | 0 | 0 | x | | | | | | x | 1 | 0 | 0 | 0 | 0 | 1 | 33.3 |
| 5760 | 0 | 1 | 0 | 1 | 1 | 0 | 1 | x | | | | | | x | 1 | 0 | 0 | 0 | 0 | 0 | 32.6 |
| 5888 | 0 | 1 | 0 | 1 | 1 | 1 | 0 | x | | | | | | x | | 1 | 1 | 1 | 1 | 1 | 31.8 |
| 6016 | 0 | 1 | 0 | 1 | 1 | 1 | 1 | x | x | x | x | x | x | x | | 1 | 1 | 1 | 1 | 1 | 31.2 |
| 6144 | 0 | 1 | 1 | 0 | 0 | 0 | 0 | x | x | x | x | x | x | x | | 1 | 1 | 1 | 1 | 0 | 30.5 |

TABLE III

K = 11

| ANALOG COUNT | \multicolumn{14}{c}{COUNTER VALUES} | | | | | | | | | | | | | | BLOCK 242 LOOK-UP TABLE 238 ROM MAP (230) | | | | | | ANALOG SPEED (FPM) |
|---|---|---|---|---|---|---|---|---|---|---|---|---|---|---|---|---|---|---|---|---|---|
| | 13 | 12 | 11 | 10 | 9 | 8 | 7 | 6 | 5 | 4 | 3 | 2 | 1 | 0 | | | | | | | |
| 2048 | 0 | 0 | 1 | 0 | 0 | 0 | 0 | 0 | x | x | x | x | x | x | 1 | 0 | 1 | 1 | 0 | 1 | 91.6 |
| 2112 | 0 | 0 | 1 | 0 | 0 | 0 | 0 | 1 | x | x | x | x | x | x | 1 | 0 | 1 | 1 | 0 | 0 | 88.8 |
| 2176 | 0 | 0 | 1 | 0 | 0 | 0 | 1 | 0 | x | x | x | x | x | x | 1 | 0 | 1 | 0 | 1 | 1 | 86.2 |
| 3904 | 0 | 0 | 1 | 1 | 1 | 1 | 0 | 1 | x | x | x | x | x | x | | 1 | 1 | 0 | 0 | 0 | 48.1 |
| 3968 | 0 | 0 | 1 | 1 | 1 | 1 | 1 | 0 | x | x | x | x | x | x | 1 | 0 | 1 | 1 | 1 | 1 | 47.3 |
| 4032 | 0 | 0 | 1 | 1 | 1 | 1 | 1 | 1 | x | x | x | x | x | x | 1 | 0 | 1 | 1 | 1 | 0 | 46.5 |

TABLE IV

K = 10

| ANALOG COUNT | \multicolumn{14}{c}{COUNTER VALUES} | | | | | | | | | | | | | | BLOCK 244 LOOK-UP TABLE 238 ROM MAP (230) | | | | | | ANALOG SPEED (FPM) |
|---|---|---|---|---|---|---|---|---|---|---|---|---|---|---|---|---|---|---|---|---|---|
| | 13 | 12 | 11 | 10 | 9 | 8 | 7 | 6 | 5 | 4 | 3 | 2 | 1 | 0 | | | | | | | |
| 1024 | 0 | 0 | 0 | 1 | 0 | 0 | 0 | 0 | 0 | x | x | x | x | x | 1 | 0 | 1 | 1 | 0 | 1 | 1 | 183 |
| 1056 | 0 | 0 | 0 | 1 | 0 | 0 | 0 | 0 | 1 | x | x | x | x | x | 1 | 0 | 1 | 1 | 0 | 0 | 0 | 177 |
| 1088 | 0 | 0 | 0 | 1 | 0 | 0 | 0 | 1 | 0 | x | x | x | x | x | 1 | 0 | 1 | 0 | 1 | 1 | 0 | 172 |
| 1952 | 0 | 0 | 0 | 1 | 1 | 1 | 1 | 0 | 1 | x | x | x | x | x | | 1 | 1 | 0 | 0 | 0 | 0 | 96 |
| 1984 | 0 | 0 | 0 | 1 | 1 | 1 | 1 | 1 | 0 | x | x | x | x | x | | 1 | 1 | 0 | 1 | 1 | 1 | 0 | 94 |
| 2016 | 0 | 0 | 0 | 1 | 1 | 1 | 1 | 1 | 1 | x | x | x | x | x | | 1 | 0 | 1 | 1 | 1 | 0 | 1 | 93 |

TABLE V

K = 9

| ANALOG COUNT | \multicolumn{14}{c}{COUNTER VALUES} | | | | | | | | | | | | | | BLOCK 246 LOOK-UP TABLE 238 ROM MAP (230) | | | | | | ANALOG SPEED (FPM) |
|---|---|---|---|---|---|---|---|---|---|---|---|---|---|---|---|---|---|---|---|---|---|
| | 13 | 12 | 11 | 10 | 9 | 8 | 7 | 6 | 5 | 4 | 3 | 2 | 1 | 0 | | | | | | | |
| 512 | 0 | 0 | 0 | 0 | 1 | 0 | 0 | 0 | 0 | 0 | x | x | x | x | 1 | 0 | 1 | 1 | 0 | 1 | 1 | 1 | 0 | 366 |
| 528 | 0 | 0 | 0 | 0 | 1 | 0 | 0 | 0 | 0 | 1 | | | | | 1 | 0 | 1 | 1 | 0 | 0 | 0 | 1 | 1 | 355 |
| 544 | 0 | 0 | 0 | 0 | 1 | 0 | 0 | 0 | 1 | 0 | | | | | 1 | 0 | 1 | 0 | 1 | 1 | 0 | 0 | 0 | 344 |
| 976 | 0 | 0 | 0 | 0 | 1 | 0 | 0 | 0 | 1 | | | | | | | 1 | 1 | 0 | 0 | 0 | 0 | 0 | 0 | 192 |
| 992 | 0 | 0 | 0 | 0 | 1 | 1 | 1 | 1 | 1 | 0 | | | | | 1 | 0 | 1 | 1 | 1 | 1 | 0 | 1 | | 189 |
| 1008 | 0 | 0 | 0 | 0 | 1 | 1 | 1 | 1 | 1 | 1 | x | x | x | x | 1 | 0 | 1 | 1 | 1 | 0 | 1 | 0 | | 186 |

TABLE VI

K = 8

| ANALOG COUNT | \multicolumn{14}{c}{COUNTER VALUES} | | | | | | | | | | | | | | BLOCK 248 LOOK-UP TABLE 238 ROM MAP (230) | | | | | | ANALOG SPEED (FPM) |
|---|---|---|---|---|---|---|---|---|---|---|---|---|---|---|---|---|---|---|---|---|---|
| | 13 | 12 | 11 | 10 | 9 | 8 | 7 | 6 | 5 | 4 | 3 | 2 | 1 | 0 | | | | | | | |
| 256 | 0 | 0 | 0 | 0 | 0 | 1 | 0 | 0 | 0 | 0 | 0 | x | x | x | 1 | 0 | 1 | 1 | 0 | 1 | 1 | 1 | 0 | 0 | 732 |
| 264 | 0 | 0 | 0 | 0 | 0 | 1 | 0 | 0 | 0 | 0 | 1 | | | | 1 | 0 | 1 | 1 | 0 | 0 | 0 | 1 | 1 | 0 | 710 |
| 272 | 0 | 0 | 0 | 0 | 0 | 1 | 0 | 0 | 0 | 1 | 0 | | | | 1 | 0 | 1 | 0 | 1 | 1 | 0 | 0 | 0 | 1 | 689 |
| 488 | 0 | 0 | 0 | 0 | 0 | 1 | 1 | 1 | 1 | 0 | 1 | | | | | 1 | 1 | 0 | 0 | 0 | 0 | 0 | 0 | 0 | 384 |
| 496 | 0 | 0 | 0 | 0 | 0 | 1 | 1 | 1 | 1 | 1 | 0 | | | | 1 | 0 | 1 | 1 | 1 | 1 | 0 | 1 | 0 | | 378 |

TABLE VI-continued

K = 8

| ANALOG COUNT | COUNTER VALUES 13 12 11 10 9 8 7 6 5 4 3 2 1 0 | BLOCK 248 LOOK-UP TABLE 238 ROM MAP (230) | ANALOG SPEED (FPM) |
|---|---|---|---|
| 504 | 0 0 0 0 0 1 1 1 1 1 1 x x x | 1 0 1 1 1 0 1 0 0 | 372 |

TABLE VII

K = 7

| ANALOG COUNT | COUNTER VALUES 13 12 11 10 9 8 7 6 5 4 3 2 1 0 | BLOCK 250 LOOK-UP TABLE 238 ROM MAP (230) | ANALOG SPEED (FPM) |
|---|---|---|---|
| 128 | 0 0 0 0 0 0 1 0 0 0 0 0 x x | 1 0 1 1 0 1 1 1 0 0 0 | 1464 |
| 132 | 0 0 0 0 0 0 1 0 0 0 0 1 x x | 1 0 1 1 0 0 0 1 1 0 0 | 1420 |
| 136 | 0 0 0 0 0 0 1 0 0 0 1 0 x x | 1 0 1 0 1 1 0 0 0 1 0 | 1378 |
| 244 | 0 0 0 0 0 0 1 1 1 1 0 1 | 1 1 0 0 0 0 0 0 0 0 | 768 |
| 248 | 0 0 0 0 0 0 1 1 1 1 1 0 | 1 0 1 1 1 1 0 1 0 0 | 756 |
| 252 | 0 0 0 0 0 0 1 1 1 1 1 1 x x | 1 0 1 1 1 0 1 0 0 0 | 744 |

TABLE VIII

K = 6

| ANALOG COUNT | COUNTER VALUES 13 12 11 10 9 8 7 6 5 4 3 2 1 0 | BLOCK 252 LOOK-UP TABLE 238 ROM MAP (230) | ANALOG SPEED (FPM) |
|---|---|---|---|
| 104 | 0 0 0 0 0 0 0 1 1 0 1 0 0 x | 1 1 1 0 0 0 0 1 0 1 0 | 1802 |
| 106 | 0 0 0 0 0 0 0 1 1 0 1 0 1 x | 1 1 0 1 1 1 0 1 0 0 0 | 1768 |
| 108 | 0 0 0 0 0 0 0 1 1 0 1 1 0 x | 1 1 0 1 1 0 1 0 0 0 0 | 1736 |
| 110 | 0 0 0 0 0 0 0 1 1 0 1 1 1 x | 1 1 0 1 0 1 0 1 0 0 0 | 1704 |
| 112 | 0 0 0 0 0 0 0 1 1 1 0 0 0 x | 1 1 0 1 0 0 0 1 0 1 0 | 1674 |
| 114 | 0 0 0 0 0 0 0 1 1 1 0 0 1 x | 1 1 0 0 1 1 0 1 1 0 0 | 1644 |
| 116 | 0 0 0 0 0 0 0 1 1 1 0 1 0 x | 1 1 0 0 1 0 1 0 0 0 0 | 1616 |
| 118 | 0 0 0 0 0 0 0 1 1 1 0 1 1 x | 1 1 0 0 0 1 1 0 1 0 0 | 1588 |
| 120 | 0 0 0 0 0 0 0 1 1 1 1 0 0 x | 1 1 0 0 0 0 1 1 0 1 0 | 1562 |
| 122 | 0 0 0 0 0 0 0 1 1 1 1 0 1 x | 1 1 0 0 0 0 0 0 0 0 0 | 1536 |
| 124 | 0 0 0 0 0 0 0 1 1 1 1 1 0 x | 1 0 1 1 1 1 0 1 0 0 0 | 1512 |
| 126 | 0 0 0 0 0 0 0 1 1 1 1 1 1 x | 1 0 1 1 1 0 1 0 0 0 0 | 1488 |

It will be noted from Table II that each memory word, starting wih the greatest decimal count 6144, increments the analog speed by less than 1 FPM, reaching an increment of about 1.4 FPM at the highest end of this speed range, i.e., 45.8 FPM. The increments continue to increase from table to table, and across each table from the low to the high speed ends, reaching an increment of 34 FPM between 1768 and 1802 FPM of Table VIII. The speed error in percent, however, is about the same in each table, being a maximum of about 3%.

In a second embodiment of the invention, the number of address bits derived from the binary count is not fixed, as in the first embodiment, but depends upon the current value of the MSB. The right-hand side of Table I sets forth an example of this second embodiment, wherein the resolution achieved at the low speed end of the speed range of the tachometer is not as good as in the first embodiment. Some applications will not require the resolution of the first embodiment. In the example of the second embodiment, when the MSB is in bit positions 12 or 11, only four bits are taken from the binary count for addressing the memory blocks associated with the MSB's of 12 and 11. These four bits start with and include the MSB. This arrangement requires only twelve memory words in memory block 240 for covering the 30 FPM to 45 FPM speed range, and it requires only sixteen words in memory block 242 for covering the speed range of 46 FPM to 91 FPM. When the MSB is in bit positions 10 or 9, only five address bits are taken from the binary count, starting with the MSB, and when the MSB is 8, 7 or 6, six address bits are taken from the binary count, as described relative to the first embodiment. Only 232 memory words are required in the look-up table 238 to cover the speed range of 30 FPM to 1800 FPM in the second embodiment. Thus, as disclosed in the second embodiment of the invention, the number of address bits for each memory block may be specifically tailored to the application, to provide the desired number of steps in each speed range.

Figure 6A:
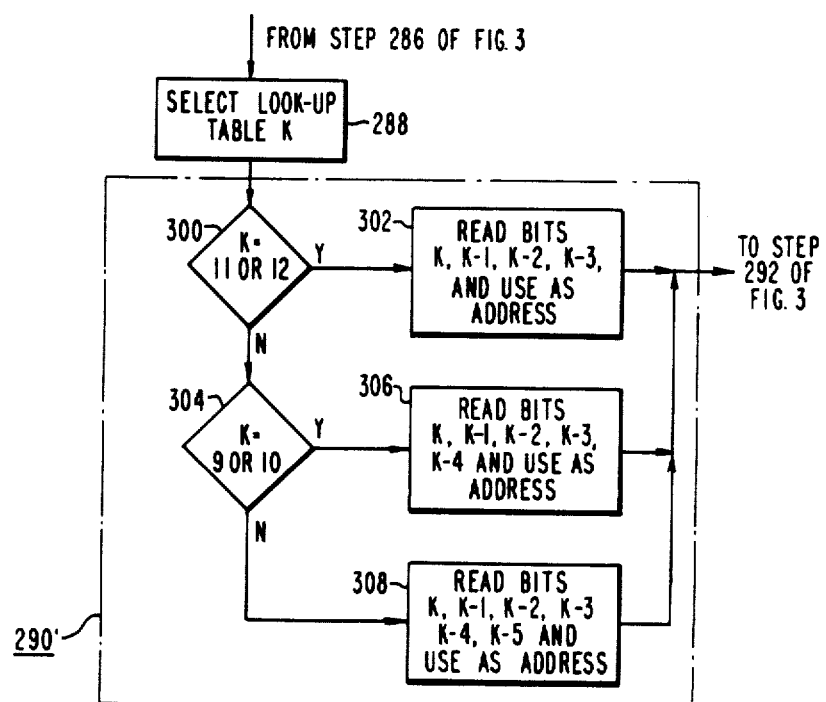
FIG. 6A is a modification of the program shown in FIG. 6, setting forth another embodiment of the invention.

FIG. 6 is a detailed flowchart of a program which may be stored in ROM 230 for implementing the first embodiment of the invention. FIG. 6A illustrates how the program shown in FIG. 6 would be modified to implement the second embodiment of the invention.

More specifically, the program is entered at terminal 260 when power is initially applied to the tachometer 200 shown in FIG. 2, and step 262 resets or zeros the binary counter 214, and it enables the oscillator 212 to start providing output pulses. CPU 218 does this by applying the appropriate logic levels to the reset (R) input and the enable (E) input of counter 214 and oscillator 212, respectively, via output port 224.

Step 264 then reads input port 222 to determine the logic level of signal 32L. As hereinbefore stated, signal 32L goes from a logic zero to a logic one level when the elevator car 40 starts to move at the start of an actual run, as opposed to releveling movement, and it remains high until the elevator car stops at the end of the run. If step 264 finds signal 32L is a logic zero, step 266 disables and resets counter 214 via output port 224, and step 268 outputs zeros to the D/A converter 216 via output port 228. The program stays in the loop which includes steps 264, 266 and 268, until the elevator car 40 starts to make a run.

When the elevator car 40 starts a run, signal 32L will go high and step 264 will then branch to step 270 which enables counter 214 by changing the logic level on its enable (E) input. Step 272 then checks for the arrival of a distance pulse PLSINT from the pulse generating means 204. CPU 218 performs this task by reading input port 222. The program loops through steps 272, 264 and 270, until step 272 detects a distance pulse. When a pulse is detected, the program branches to step 274. If CPU 218 has other tasks to perform, it would also be suitable to tie the PLSINT line to an interrupt input of digital computer 210, which will then automatically interrupt whatever the CPU 218 is doing when a PLSINT pulse is received, and the program will be written to automatically vector the program to step 274 in response to such an interrupt.

Step 274 disables the binary counter 214, it reads the count applied to input port 226, and it stores this binary count in RAM 232, as shown in the RAM map of FIG. 5. It also resets the counter 214 to zero, and it then re-enables the counter 214 to again start counting the pulses, or transitions, produced by the output oscillator 212. Depending upon the accuracy required, it would also be suitable to operate the tachometer with two binary counters. With two binary counters, after the operative counter is disabled in step 274, the CPU would immediately enable the other counter, before proceeding with the steps of processing the count of the disabled counter.

Step 274 proceeds to step 276, which sets a variable K to a value representative of decimal 12. The initial value of K is stored in ROM 230, as shown in the ROM map of FIG. 4, and its value will depend upon the most significant bit of the binary count which will go to a logic one over the speed range of the tachometer 200. Thus, it is determined by the low end of the speed range. In the example of the present application, bit position 12 is the most significant bit which will go to the logic one level over the speed range of 30 FPM to 1800 FPM, using a 150 KHz oscillator, and a standard increment which produces a distance pulse for each 0.25 inch of elevator car travel.

Step 278 checks to see if bit position K of the binary count is a logic one. If it is not a logic one, step 280 decrements the value K, and step 282 checks to see if the value of K is now smaller than a constant S. The constant S is stored in ROM 230, as shown in the ROM map of FIG. 4. The constant S is the lowest bit position which will be the MSB over the speed range of the tachometer 200, and its value is thus determined by the high end of the speed range. In the example of FIG. 3, the lowest bit position which will be the MSB is bit position 6. Thus, the constant S will be set to 0110 in ROM 230. If step 282 finds the value of K is not less than six, the program returns to step 278 which checks this new bit position for the presence of a logic one. If step 282 finds the value of K is less than the value of S (i.e., six), step 284 outputs the highest speed value to the D/A converter 216. In the example set forth, the highest speed value, shown in Table VIII, would be binary 111 0000 1010 (decimal 1802).

If step 278 detects that the current value of K is a logic one, step 278 proceeds to step 286. Step 286 makes sure that the K count has not proceeded too close to the LSB of the binary count. In other words, so close that a memory address cannot be correctly derived from the binary count. Since in the example of the first embodiment, six bits of the count, starting with the MSB, are used to address the selected memory block, step 286 checks to see if the value of K minus 5 is equal to or less than zero. If so, the program goes to step 284, to output the maximum speed value to the D/A converter. If step 286 finds the value of K is not too close to the LSB to properly derive an address from it, step 288 selects a memory block of the look-up table 238 stored in ROM 230, according to the present value of K. For example, as shown in FIG. 3, if K is 11, memory block 242 would be selected. Step 290 then derives the address which will be used to address the selected memory block. In the example of the first embodiment, six consecutive bits, starting with the MSB, are used as the memory address. Thus, step 290 reads bits K, K-1, K-2, K-3, K-4 and K-5 of the binary count, and it uses these bits to address the selected memory block. The contents of the addressed memory storage location are output to the D/A converter 216 via step 292, and the program returns to step 264, hereinbefore described.

FIG. 6A illustrates how the program of FIG. 6 would be modified to derive an address from the binary count according to the bit location of the MSB. FIG. 6A implements the example shown on the right-hand side of Table I. In this embodiment, step 290 of FIG. 6 is replaced by the steps shown within the broken outline 290' of FIG. 6A. Step 288 proceeds to a step 300 which checks to see if the value of K is equal to 12 or 11. If so, step 302 selects four bits from the binary count, starting with the MSB, for the address of the selected memory block. If step 300 finds that K is not equal to 12 or 11, step 304 checks to see if K is equal to 10 or 9. If so, step 306 selects five bits from the binary count, starting with the MSB, for use as the address of the selected memory block. If K is not a 10 or a 9, it must be an 8, 7 or a 6, and step 308 selects six bits of the binary count, starting with the MSB, for use as the address of the selected memory block.

In summary, there has been disclosed a new and improved digital tachometer which has minuscule memory requirements, notwithstanding the ability of addressing look-up tables from count values which vary from about six binary digits to thirteen or more. Further, the reduction in memory requirement has been achieved while maintaining excellent resolution across the speed range, and low speed error, which is important in certain applications, such as elevator systems.

We claim as our invention:

1. A digital tachometer for measuring the speed of a device, comprising:
   means for providing first pulses at a rate proportional to the speed of the device,
   means for providing second pulses at a constant rate, which exceeds the maximum rate of said first pulses,
   means for providing a binary count of the second pulses produced between two consecutive first pulses,
   look-up table means for storing digital representations of speed, said look-up table means comprising a plurality of memory blocks each having a plurality of addressable storage locations,
   means responsive to the bit position of the MSB of the binary count for selecting a memory block, said MSB defining a count having a predetermined maximum number of binary words according to the bit location of the MSB, means deriving an address from the binary count, said binary address starting with and including the MSB, said binary address having fewer bits than the number of bits in the binary count from which it was derived, regardless of the bit position of the MSB, such that the maximum number of binary words for any bit position of the MSB is less than the predetermined maximum number of binary words defined by the bit position of the MSB, and means for addressing the selected memory block with the derived address to obtain the digital representation of speed stored at this address.

2. The digital tachometer of claim 1 wherein the means which derives an address from the digital count utilizes a predetermined fixed number of consecutive bits from the binary count, with said fixed number being less than the lowest MSB bit position utilized to select a memory block.

3. The digital tachometer of claim 1 wherein the means which derives an address from the digital count utilizes a predetermined number of consecutive bits from the binary count, with the predetermined number being responsive to the bit position of the MSB, and with the predetermined number always being less than the number of binary bits which make up the count.

4. The digital tachometer of claim 1 wherein the constant rate of the second pulses is selected to be at least about 100 times the maximum rate of the first pulses.

5. The digital tachometer of claim 1 wherein the number of memory blocks is responsive to the minimum and maximum speeds to be measured.

6. The digital tachometer of claim 1 wherein the means which provides the first pulses provides a pulse for each 0.25 inch of travel of the device, the means which provides the second pulses provides them at a constant rate of at least 150,000 pulses per second, the binary count will accommodate a count having at least 13 bits, and there are at least seven memory blocks each having a maximum of 64 addressable storage locations.

* * * * *